Oct. 17, 1961     E. ROESCH     3,004,287
TREAD CENTERING MECHANISM FOR TIRE RETREADING MOLDS
Filed April 1, 1958     2 Sheets-Sheet 1
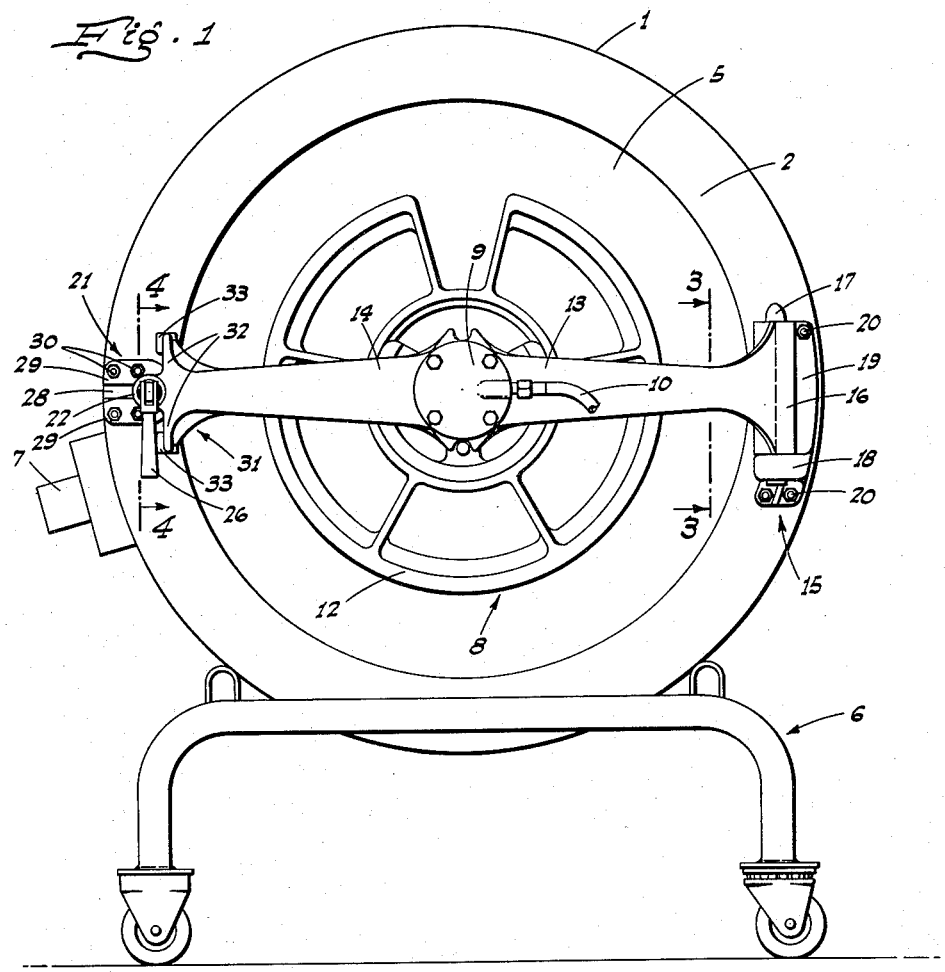
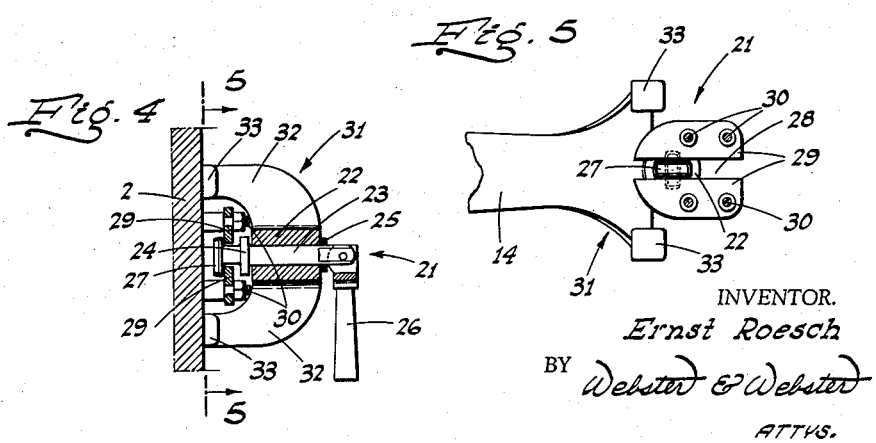
INVENTOR.
Ernst Roesch
BY Webster & Webster
ATTYS.

Oct. 17, 1961  E. ROESCH  3,004,287
TREAD CENTERING MECHANISM FOR TIRE RETREADING MOLDS
Filed April 1, 1958  2 Sheets-Sheet 2
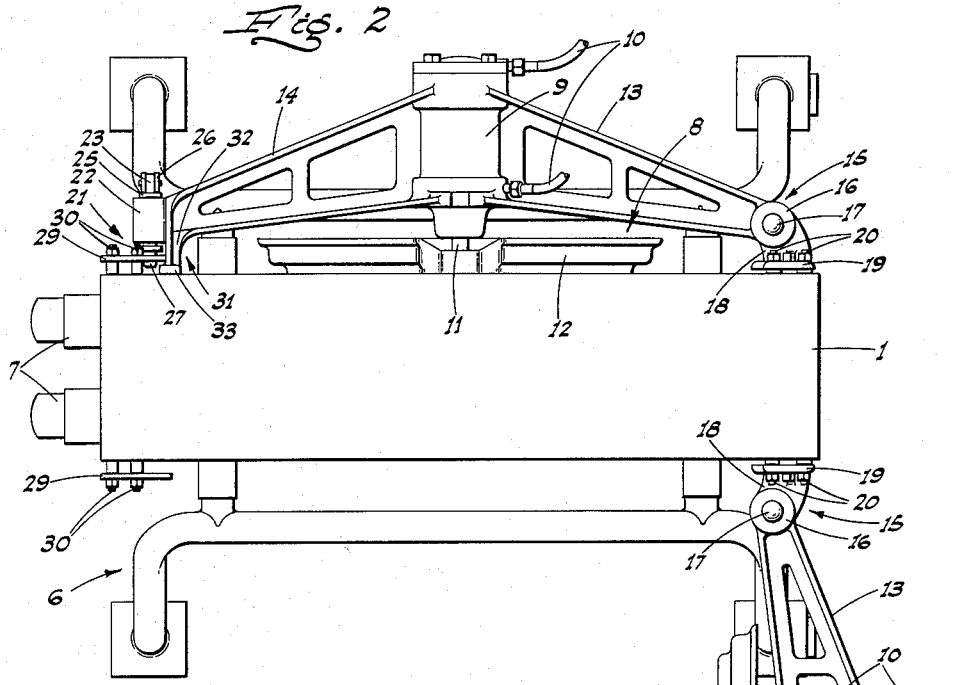
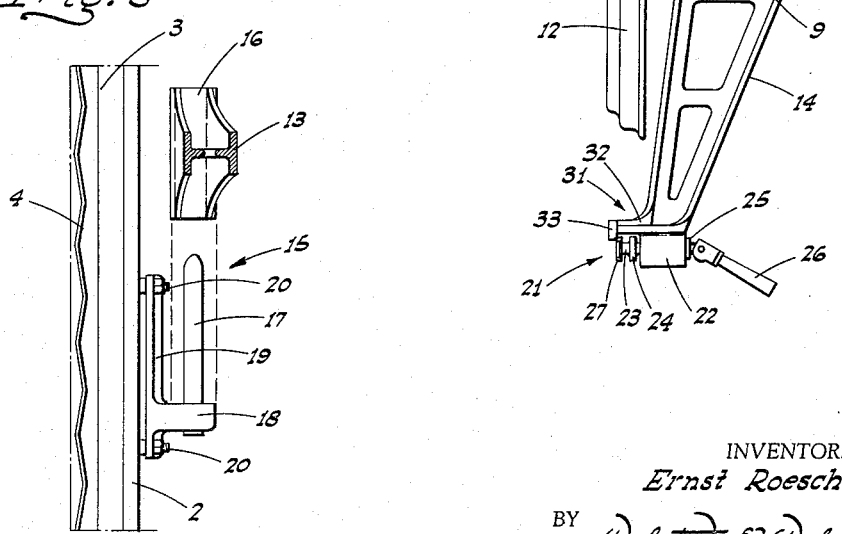
INVENTOR.
*Ernst Roesch*
BY *Webster & Webster*
ATTYS.

United States Patent Office 3,004,287
Patented Oct. 17, 1961

3,004,287
TREAD CENTERING MECHANISM FOR TIRE RETREADING MOLDS
Ernst Roesch, Lodi, Calif., assignor to Super Mold Corporation of California, Lodi, Calif., a corporation of California
Filed Apr. 1, 1958, Ser. No. 725,540
3 Claims. (Cl. 18—18)

This invention relates in general to improvements in a tread centering mechanism for a band-type, tire retreading mold, and which mechanism includes separate pressure ring units corresponding to and mounted to work—in operative position—through the opposite and open sides of the mold whereby to engage and yieldably urge the beads of a tire therein towards each other so as to aline such beads and center the tread of the tire in said mold.

A major object of the invention is to provide, for each of such pressure ring units, a novel mount which attaches the unit to the adjacent side of the mold for swinging motion between a closed operative position, and an open non-operative position with said adjacent side of the mold unobstructed so as to permit a tire to be placed in—or removed from—said mold.

Another important object of the invention is to provide a mount, as above, which includes an arm structure quick-releasably hinged at one end and quick-detachably latched at the other end to the mold, whereby the mount can be readily and speedily manually unlatched and wholly detached, with the pressure ring unit, from the mold, or merely unlatched and swung from closed to open position without removal from said mold, selectively and as working conditions may require.

An additional object of the invention is to secure the arm structure to the mold in a manner to resist any twisting or torque effect which may be imposed on said arm structure during operation of the supported pressure ring unit.

It is also an object of the invention to produce a practical, reliable, and durable mount for a tread centering mechanism, and one which will be exceedingly effective for the purpose for which it is designed.

These objects are accomplished by means of such structure and relative arrangement of parts as will fully appear by a perusal of the following specification and claims.

FIG. 1 is a side elevation of a band-type, tire retreading mold embodying the present invention; the near pressure ring unit being shown in its closed, operative position.

FIG. 2 is a top plan view of the same; one pressure ring unit being shown in its closed, operative position, while the other pressure ring unit is shown in its open, non-operative position.

FIG. 3 is a fragmentary transverse vertical section taken on line 3—3 of FIG. 1, showing the hinge parts separated.

FIG. 4 is a fragmentary enlarged transverse vertical section, taken on line 4—4 of FIG. 1, showing the latch as engaged.

FIG. 5 is a fragmentary transverse vertical elevation, taken on line 5—5 of FIG. 4.

Referring now more particularly to the drawings, and to the characters of reference marked thereon, the numeral 1 indicates a unitary, portable, band-type mold of endless or circular form which includes—on opposite sides—radially inwardly extending, annular skirts 2 which define—in said mold—an endless matrix cavity 3 having the tread design elements 4 therein. The mold 1, within the confines of the side skirts 2, has a circular opening 5 at each side of said mold; the latter being supported in a vertical position—i.e. with its axis horizontal—by a cradle-like dolly 6 which permits movement of the mold from place to place.

The mold 1 is heated in a conventional manner, and by suitable means such as steam or electricity; the fittings for connection of the heating medium being indicated at 7.

The tread centering mechanism associated with the mold 1 comprises—at each side thereof—a pressure ring unit, indicated generally at 8. As the pressure ring units 8 are each of identical construction, including the mount therefor, a description of one will suffice for both.

Each pressure ring unit 8 comprises a double acting, fluid energized power cylinder 9 controlled by a valve regulated, fluid pressure conduit system, indicated only in part as at 10.

A piston rod 11 projects out of one end of the power cylinder 9, and exteriorly of the latter such rod is fitted with a shouldered tire bead engaging ring 12.

When each pressure ring unit 8 is in its operative position, mounted as hereinafter described, the piston rod 11 is coaxial with the mold 1, and the ring 12 is disposed initially mainly outwardly of the adjacent side opening 5; the diameter of the ring 12 being such that it may move inwardly through such opening 5 for engagement with the adjacent bead of a tire (not shown) previously placed in said mold.

The mount for each pressure ring unit 8 comprises the following:

A pair of opposed, heavy-duty arms, indicated at 13 and 14, are formed integral with the power cylinder 9 and radiate horizontally therefrom. At its outer end the arm 13 is quick-removably hinged to the adjacent part of the corresponding side skirt 2 by a hinge assembly, indicated generally at 15. Such hinge assembly comprises an upstanding, vertically elongated sleeve 16 integral with the outer end of arm 13, and which sleeve 16 is engaged—from above—full length on an upstanding, vertically elongated, heavy-duty pin 17 secured at its lower end to a horizontally outwardly projecting bracket 18 carried in rigid relation on a back plate 19; the pin 17 being spaced a distance outwardly of said back plate 19 to permit the sleeve 16 to be slipped on or off said pin. The back plate 19 is fixed to the adjacent part of the corresponding side skirt 2 by bolting, as at 20.

With the hinge 15 constructed as described, the pressure ring unit 8, together with the mount comprised of the arms 13 and 14, can be swung between closed and open positions, or—selectively—can be wholly removed from the mold by the simple expedient of sliding the sleeve 16 upwardly off of the pin 17.

A manually quick-releasable latch assembly 21 is provided between the outer end of the arm 14 and the adjacent part of the corresponding side skirt 2; such latch assembly 21 being operative to secure the pressure ring unit 8, and its mount comprised of the arms 13 and 14, in closed operative position.

The latch assembly 21 includes—on the outer end of arm 14—an integral bearing boss 22 disposed with its bore horizontal and parallel to the axis of the power cylinder 9; such boss terminating, at its inner end, a distance outwardly from the adjacent part of the corresponding side skirt 2.

A rotary shaft 23 extends through the boss 22 and projects beyond both ends thereof; such shaft being prevented from material axial displacement by collars 24 and 25 thereon, the inner collar 24 being fixed on the shaft.

At its outwardly projecting end the shaft 23 is fitted with a pivoted lever arm or handle 26, while at its inner end—which projects inwardly from the collar 24—said shaft 23 is fitted with a transverse catch 27. The catch 27, which is relatively narrow, is secured centrally to the shaft 23 and projects at the ends therebeyond, being elongated diametrally of the shaft.

When the pressure ring unit 8 is in its closed operative position, with the outer end of the arm 14 overlying the adjacent part of the corresponding side skirt 2, the catch, 27, upon suitable turning of the shaft 23, may pass through a slot 28 formed between adjacent parallel edges of vertically spaced, horizontally disposed catch plates 29 fixed in stand-off relation to the side skirt 2 by bolts 30.

After the catch 27 passes through the slot 28, and at which time said catch is parallel to such slot, the shaft 23 is part-turned by the lever arm 26 to disposed said catch 27 in crossing relation to the slot 28 and locked against the back side of the catch plates 29. When manipulating the shaft and catch, the handle 26 is first turned about its pivotal connection with the shaft to a position substantially as shown in FIG. 2. After the catch is inserted through slot 28, and is then disposed substantially at right angles thereto, the handle is turned on its pivot to dispose the same substantially at right angles to the shaft, as shown in FIG. 4. When the handle is so turned, the cam surface on the pivoted end of the handle, as shown in dotted lines in FIG. 4, engages the adjacent collar 25 and causes the shaft 23 to be pulled slightly forward, so as to cause the catch 27 to bind against the catch plates 29 so that a tight latching action is obtained. The latch assembly 21 can be manually quick-released by first swinging the handle about its pivot so as to disengage the cam surface from the collar 25, and then rotating the shaft 23 to a point at which the catch 27 escapes the catch plates 29, and is then alined with—and can be withdrawn through—the slot 28.

In order to prevent any twisting or torque effect in the arms 13 and 14 when the pressure ring unit 8 is in operative position and forcefully engaging the bead of a tire in the mold 1, the hinge assembly 15 is of the described heavy-duty construction, and further the outer end of the arm 14 is provided with a stabilizing foot arrangement, indicated generally at 31.

The stabilizing foot arrangement 31 comprises upper and lower legs 32 formed integral with said outer end of the arm and curving therefrom inwardly toward the mold; each leg at its inner end being provided with an enlarged foot 33 which firmly abuts the adjacent part of the corresponding side skirt 2 when the latch assembly 21 is engaged. With the feet 33 thus abutting the side skirt 2 at vertically spaced points, any twisting or torque effect in the arm structure is further effectively resisted.

In use of the mold 1, the latch assemblies 21 are first released and then the arm structures, with the pressure ring units 8 thereon, are swung outwardly until the open sides 5 of such mold are unobstructed. Thereafter, a tire to be retreaded is inserted into the mold 1 by apparatus known as a "tire spreader."

After the tire is placed in the mold the arm structures are swung back to their "in-use" position spanning between opposite sides of the mold, and the latch assemblies 21 are re-engaged.

Thereafter, the power cylinders 9 are energized to cause the piston rods 11 to advance, and so that the rings 12 engage and yieldably press inwardly on the tire beads from the outside thereof, whereby to aline the beads and to center the tire tread in the mold preparatory to the vulcanizing operation.

During the vulcanizing operation the mounts and the pressure ring units thereon may be permitted to remain in operative position; released and swung out to the non-operative position; or wholly removed from the mold.

As the hinge assemblies 15 permit the mounts and the pressure ring units thereon, to be quickly and readily removed from the mold, a substantial advantage is attained in that the tread centering mechanism can be wholly detached from a mold during the tread vulcanizing operation, and used in connection with another mold.

It will be understood that after the vulcanizing operation is complete, the mounts and the pressure ring units—if they remain on the mold—are disposed in their swung-out, non-operative position so as to permit a tire spreader to enter the mold to engage and remove the tire.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In the pressure unit of a horizontal-axis tire mold, there being a single centrally disposed vertical-axis hinge on one side of the unit connecting the same to the adjacent side skirt of the mold, the unit including an arm projecting in opposition to the hinge and overlapping the skirt on the corresponding side of the mold, a device releasably latching the outer end of the arm to the skirt, and means rigid with said arm bearing, when said arm is latched, in arm-stabilizing relation against the skirt at points below and above said latching device.

2. A mount, as in claim 1, in which said stabilizing means comprises upper and lower legs rigid with said arm and extending toward said points on the skirt, and a foot on each leg abutting said skirt.

3. In the pressure unit of a horizontal-axis tire mold, there being a single centrally disposed vertical-axis hinge on one side of the unit connecting the same to the adjacent side skirt of the mold, the unit including a horizontal arm projecting in opposition to the hinge and overlapping the skirt on the corresponding side of the mold; means including vertically spaced feet rigid with the arm at its outer end to engage the skirt and then maintaining the adjacent face of the arm spaced from the skirt, a latching device mounted on the arm between the feet and including a horizontal manually turnable shaft journaled in and projecting through the arm and an elongated cross head on the inner end of the shaft disposed in spaced relation to the skirt and to the arm, a catch plate unit providing a slot to receive the head lengthwise therethrough, and means mounting the plate unit on the skirt in a position between the feet laterally out from the skirt between the cross head and the arm when the feet are engaged with the mold skirt.

References Cited in the file of this patent

UNITED STATES PATENTS

| | | |
|---|---|---|
| 574,463 | Tisch | Jan. 5, 1897 |
| 610,243 | Reno | Sept. 6, 1898 |
| 1,197,702 | Williams | Sept. 12, 1916 |
| 1,201,940 | Craig | Oct. 17, 1916 |
| 1,670,284 | Denmire | May 15, 1928 |
| 2,712,156 | Potter et al. | July 5, 1955 |
| 2,734,225 | Glynn | Feb. 14, 1956 |
| 2,902,717 | Duerksen | Sept. 8, 1959 |
| 2,908,959 | Hogan et al. | Oct. 20, 1959 |

FOREIGN PATENTS

| | | |
|---|---|---|
| 263,982 | Germany | July 8, 1911 |